US012176499B2

(12) United States Patent
Park et al.

(10) Patent No.: US 12,176,499 B2
(45) Date of Patent: Dec. 24, 2024

(54) NON-DESTRUCTIVE BATTERY FIRE SUPPRESSION

(71) Applicant: RePurpose Energy Inc., Alamo, CA (US)

(72) Inventors: Jae Wan Park, Alamo, CA (US); Joseph Lacap, Alamo, CA (US)

(73) Assignee: RePurpose Energy Inc., Alamo, CA (US)

( * ) Notice: Subject to any disclaimer, the term of this patent is extended or adjusted under 35 U.S.C. 154(b) by 511 days.

(21) Appl. No.: 17/452,055

(22) Filed: Oct. 22, 2021

(65) Prior Publication Data

US 2022/0158277 A1 May 19, 2022

Related U.S. Application Data

(60) Provisional application No. 63/140,702, filed on Jan. 22, 2021, provisional application No. 63/106,807, filed on Oct. 28, 2020.

(51) Int. Cl.
*H01M 50/143* (2021.01)
*A62C 3/06* (2006.01)
*A62C 3/16* (2006.01)
*H01M 10/48* (2006.01)
*H01M 10/653* (2014.01)
*H01M 50/289* (2021.01)
*H01M 50/609* (2021.01)
*H01M 10/42* (2006.01)

(52) U.S. Cl.
CPC ............. *H01M 10/486* (2013.01); *A62C 3/06* (2013.01); *A62C 3/16* (2013.01); *H01M 10/653* (2015.04); *H01M 50/289* (2021.01); *H01M 50/609* (2021.01); *H01M 2010/4271* (2013.01)

(58) Field of Classification Search
CPC ............ A62C 3/06; A62C 3/16; H01M 10/48; H01M 10/486; H01M 10/653; H01M 2010/4271; H01M 50/289; H01M 50/574; H01M 50/581; H01M 50/609; Y02E 60/10
See application file for complete search history.

(56) References Cited

U.S. PATENT DOCUMENTS

| 2007/0025081 | A1* | 2/2007 | Berlin | H05K 7/20909 361/698 |
| 2012/0021260 | A1* | 1/2012 | Yasui | H01M 10/615 429/71 |
| 2018/0048032 | A1* | 2/2018 | Takatsuka | G01L 5/0052 |
| 2020/0271725 | A1* | 8/2020 | Herring | G01R 31/367 |

FOREIGN PATENT DOCUMENTS

| DE | 102015121032 A1 * | 6/2017 |
| JP | 2017147128 A * | 8/2017 |

OTHER PUBLICATIONS

Machine Translation JP2017147128A (Year: 2017).*
3M Novec 7100 Engineered Fluid Product Information, 2009, pp. 1-4 (Year: 2009).*
3M Novec 7000 Engineered Fluid Product Information, 2014, pp. 1-6 (Year: 2014).*
Machine translation DE102015121032A1 (Year: 2017).*

* cited by examiner

*Primary Examiner* — Victoria H Lynch
(74) *Attorney, Agent, or Firm* — Squire Patton Boggs (US) LLP

(57) ABSTRACT

Provided herein are methods and systems for preventing and/or suppressing fire in a rechargeable battery.

20 Claims, 9 Drawing Sheets

Typical Physical Properties

Figure 1:
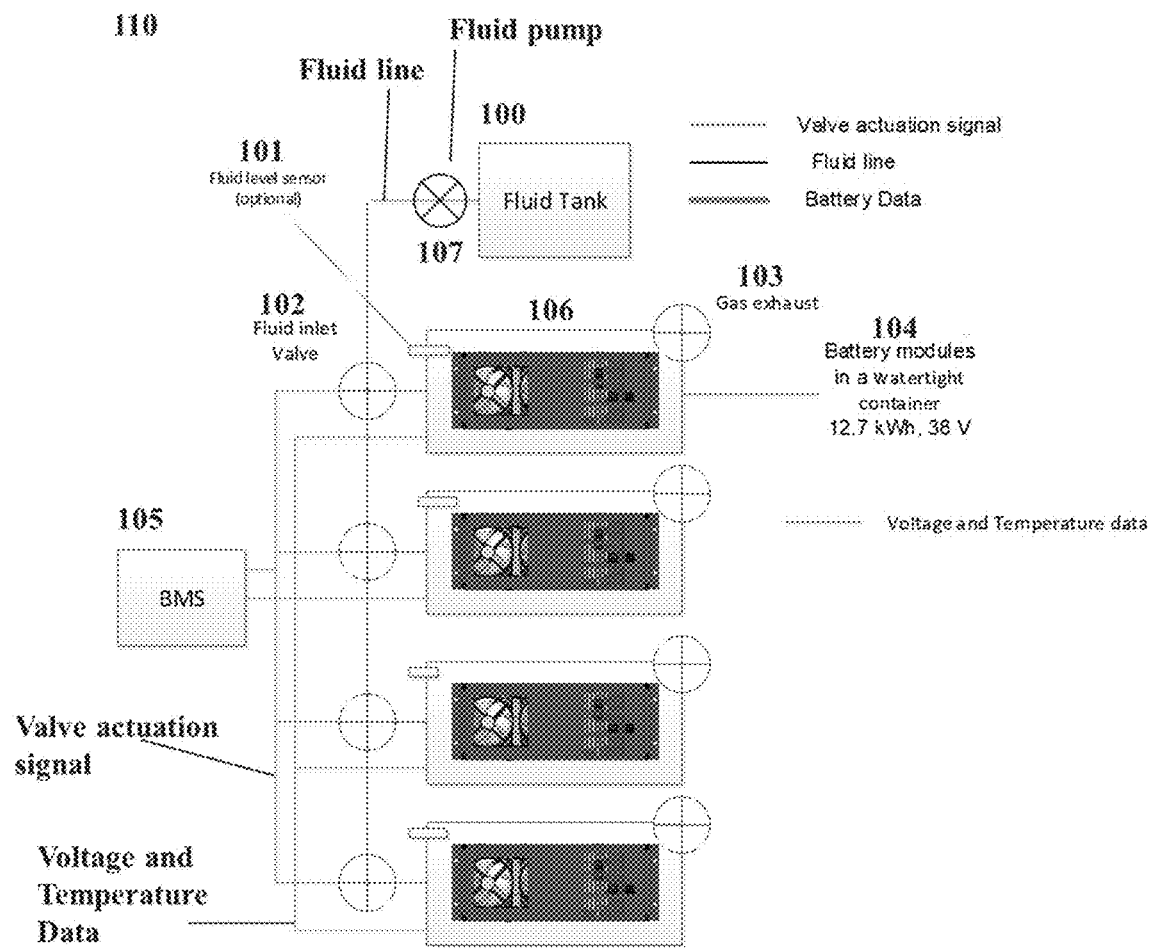

| Property | Novec 7100 | | | | |
|---|---|---|---|---|---|
| Formula | C₄F₉OCH₃ | C₃O₂F₆ | C₃O₂H₂F | C₃O₂HF₅ | C₃H₂F₁₀ |
| Molecular Weight | 250 | 187 | 117 | 203 | 252 |
| Boiling Point (°C) | 61 | 48 | 32 | 54 | 54 |
| Freeze Point (°C) | -135 | -35 | -103 | -131 | -80 |
| Liquid Density (g/ml) | 1.52 | 1.58 | 1.23 | 1.55 | 1.58 |
| Surface Tension (dynes/cm) | 13.6 | 17.3 | 19.3 | 16.2 | 14.1 |
| Solubility of Solvent in Water (ppmw) | 12 | 170 | 210 | 330 | 140 |
| Solubility of Water in Solvent (ppmw) | 95 | 110 | 420 | 310 | 480 |
| Vapor Pressure (mmHg) | 202 | 334 | 589 | 290 | 226 |

Vapor Pressure and Density

The variation of vapor pressure and density with temperature for 3M™ Novec™ 7100 Engineered Fluid can be calculated using the following formulas:

Vapor Pressure: $\ln P = 22.415 - 3641.9 \, [1/(t+273)]$

Density: $D = 1.5383 - 0.002269t$

P = Vapor Pressure in Pascals
t = Temperature in °C
D = Density in g/ml

FIG. 3

Typical Physical Properties

Not for specification purposes. All values @ 25°C unless otherwise specified.

| Properties | 3M™ Novec™ 770 Engineered Fluid |
|---|---|
| Boiling Point @ 1 atm | 167°C (333°F) |
| Pour Point | -50°C (-58°F) |
| Molecular Weight | 528 |
| Liquid Density | 1797 kg/m³ |
| Coefficient of Expansion | 0.00111 K⁻¹ |
| Latent Heat of Vaporization @ 1 atm | 83.4 kJ/kg |
| Vapor Pressure | <0.1 kPa |
| Surface Tension | 18 dynes/cm |
| Viscosity | 2.5 cSt |
| Critical Temperature | 290°C (554°F) |
| Critical Pressure | 1.41 MPa |
| Solubility of Fluid in Water | <1 ppb by weight |
| Dielectric Strength | 35 kV, 0.1" gap |
| Volume Resistivity | $5 \times 10^{14}$ ohm-cm |
| Dielectric Constant | 6.7 |
| Flammability | Nonflammable |
| GWP | 420 |

FIG. 4

NON-DESTRUCTIVE BATTERY FIRE SUPPRESSION

This application claims priority to, and the benefit of, U.S. Provisional Patent Application No. 63/106,807, filed Oct. 28, 2020, and also U.S. Provisional Patent Application No. 63/140,702, filed Jan. 22, 2021, both of which are herein incorporated by reference in their entirety for all purposes.

FIELD

The present disclosure concerns rechargeable batteries and related fire suppression systems.

BACKGROUND

Rechargeable lithium-ion batteries are in demand for a host of energy storage applications on account of their high energy density and power output. Energy storage devices are needed for consumer electronics, electric vehicles and energy storage installations. Energy storage installations are increasingly being used to provide continuous back-up electricity whenever traditional grid sources are unavailable.

There are a series of unmet problems related to rechargeable lithium-ion battery installations. One such problem relates to safety. The safety problem includes preventing as well as suppressing fires that arise due to battery faults, mismanagement, overuse, or high temperatures. Safety concerns are currently a barrier to greater market adoption of such energy storage installations. For example, certain fire departments ban indoor installations of energy storage systems that include lithium-ion batteries.

Currently, some lithium-ion battery energy storage installations are constructed outside and far from dense populations. These installations require a secondary housing, HVAC systems, and dedicated land.

What is needed is improved systems which allow lithium-ion battery energy storage installations to be constructed inside. What is also needed is an efficient and cost-effective method for preventing and suppressing lithium-ion battery fires in energy storage installations. Set forth herein are solutions to these problems as well as others in the field to which the instant disclosure pertains.

SUMMARY

In one embodiment, set forth herein is a method for non-destructive battery fire suppression including: providing, or having provided, at least one open battery enclosure including at least one battery cell or at least one battery module; detecting a high temperature, a battery fault, a battery failure, a battery off-gassing, a fire, or a combination thereof, in the at least one battery cell or at least one battery module; and contacting the at least one battery cell or at least one battery module with a non-conductive dielectric fluid that undergoes a phase change during the contacting.

In another embodiment, set forth herein is a system including, at least one watertight battery module including at least two battery cells, wherein each battery cell is separated by watertight partitions; at least one container including a non-conductive dielectric fluid; and at least one fluid line connecting the at least one container to the at least one watertight battery module; wherein the at least one fluid line comprises at least one valve operably coupled to a battery management system (BMS).

BRIEF DESCRIPTIONS OF THE DRAWINGS

Figure 2:
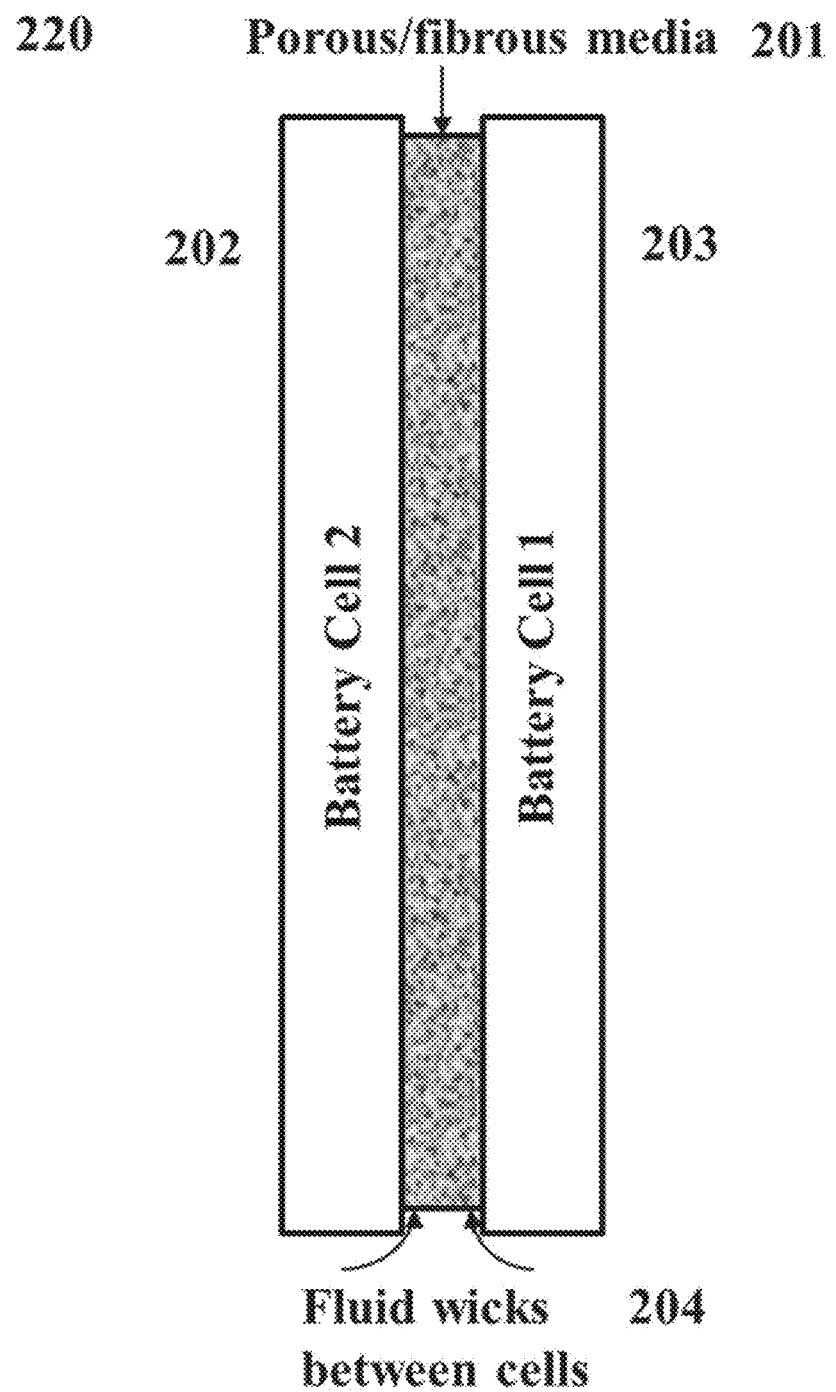
Figure 5:
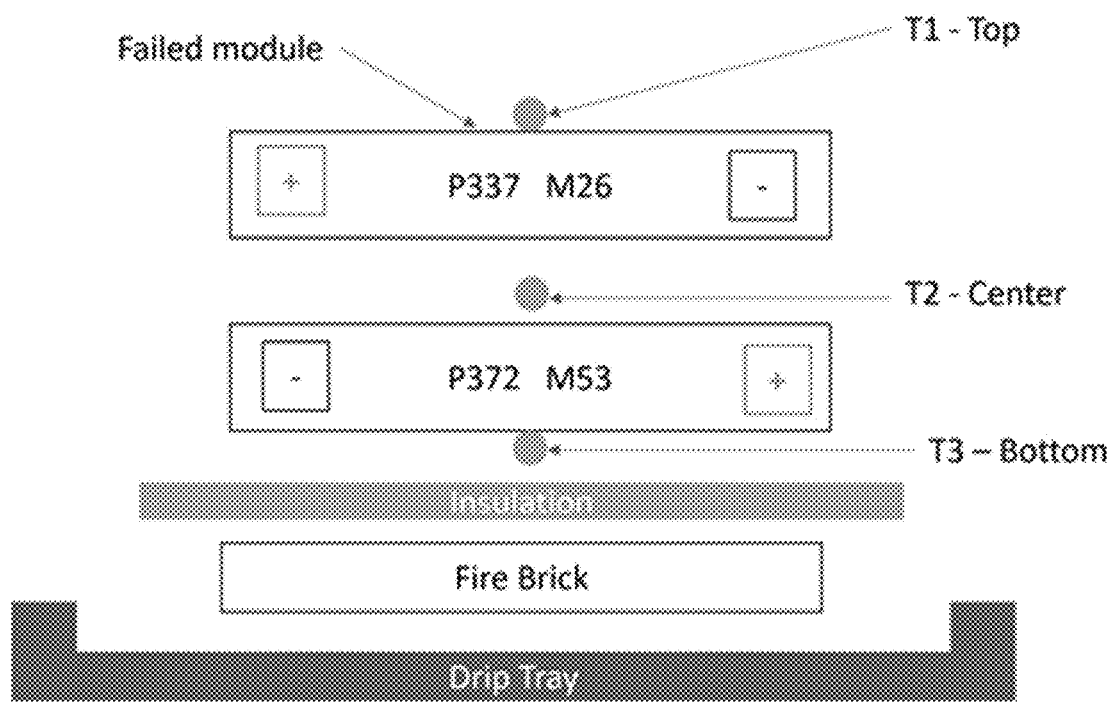
Figure 6:
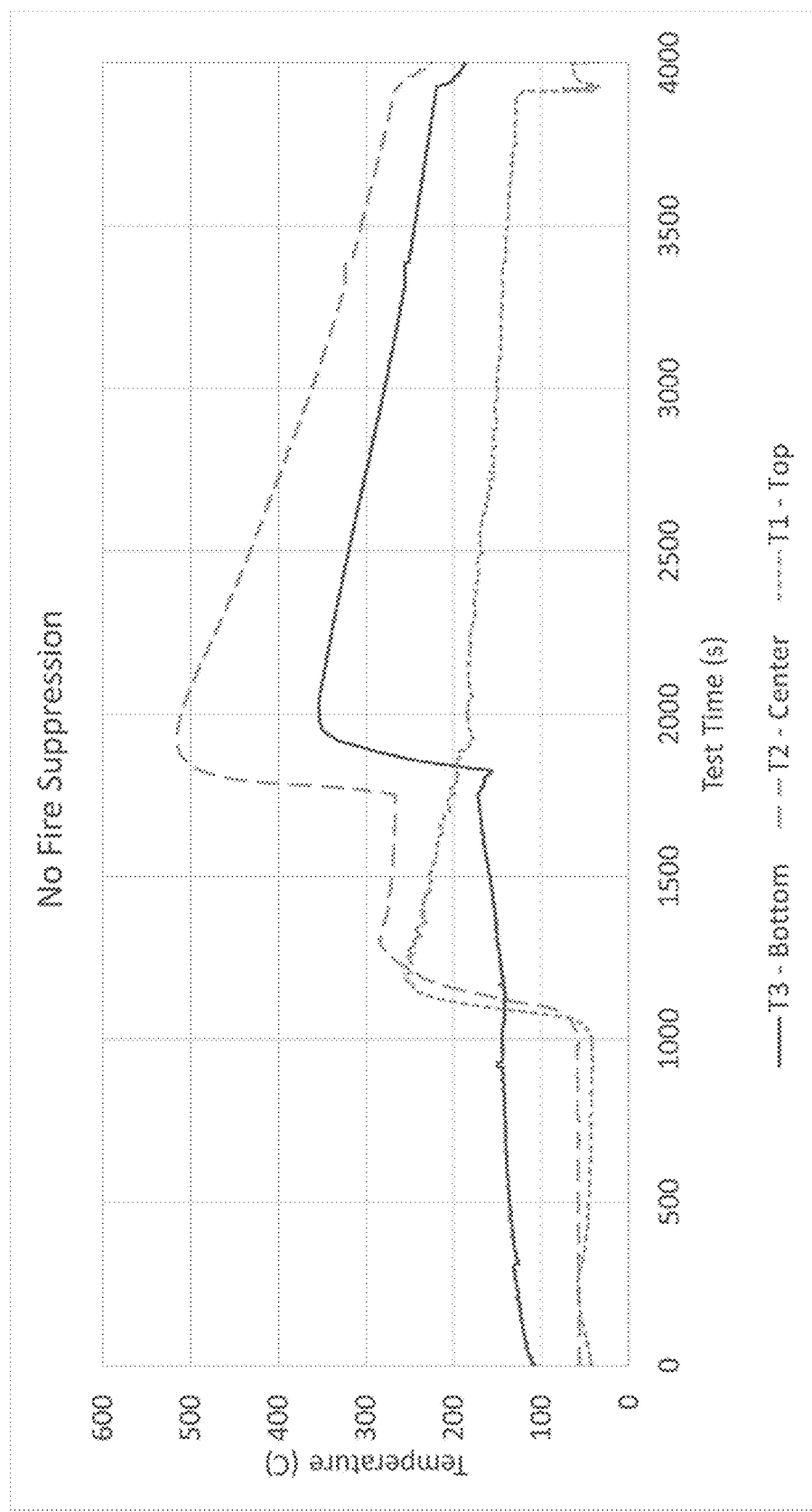
Figure 7:
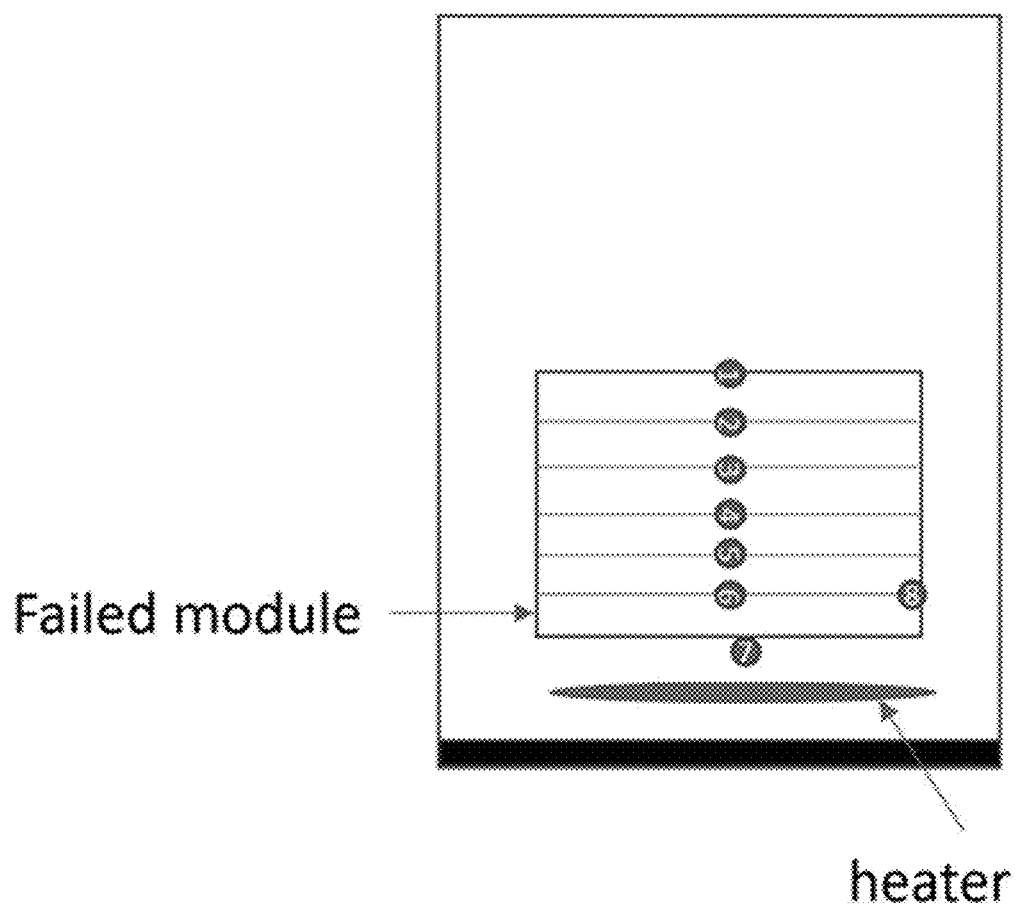
Figure 8:
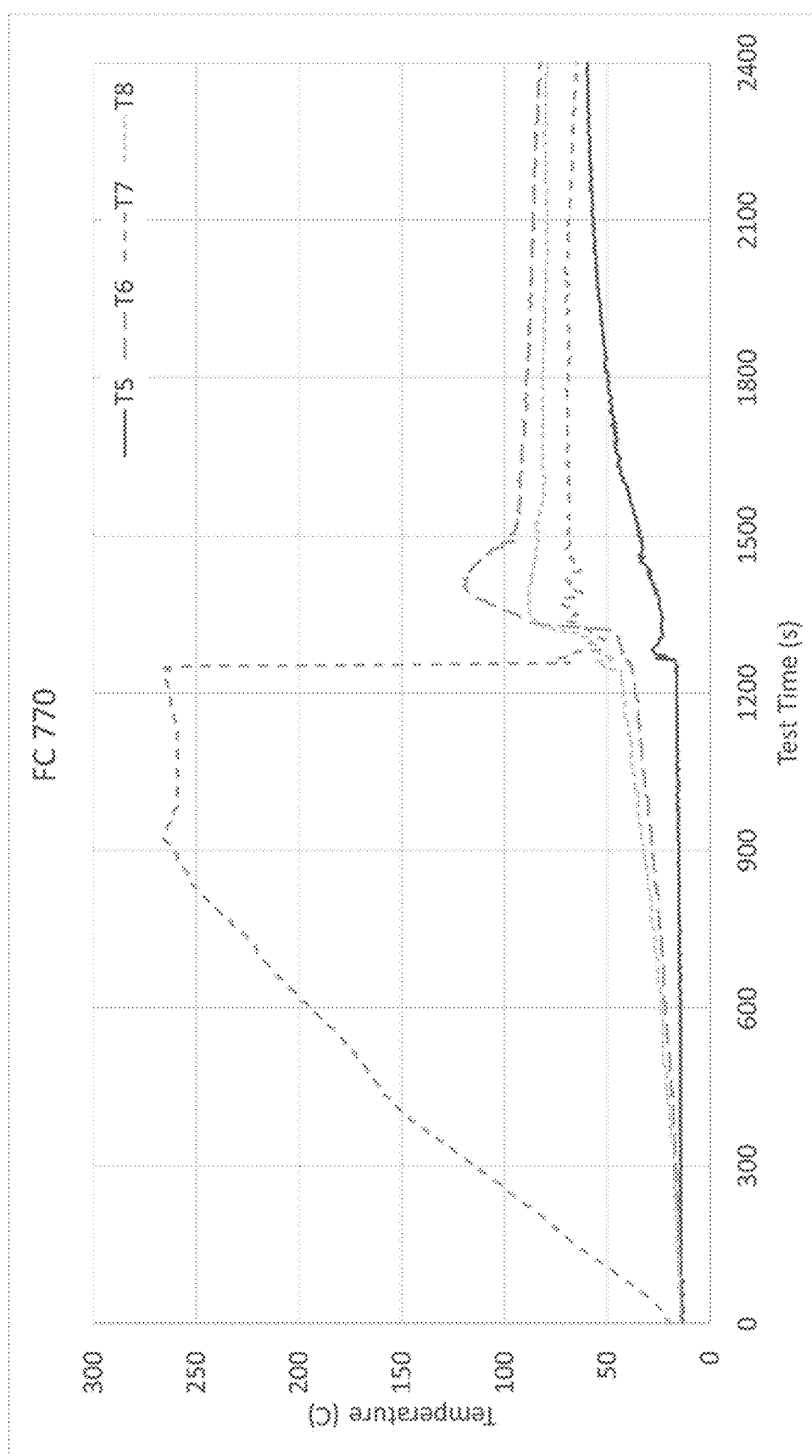
Figure 9:
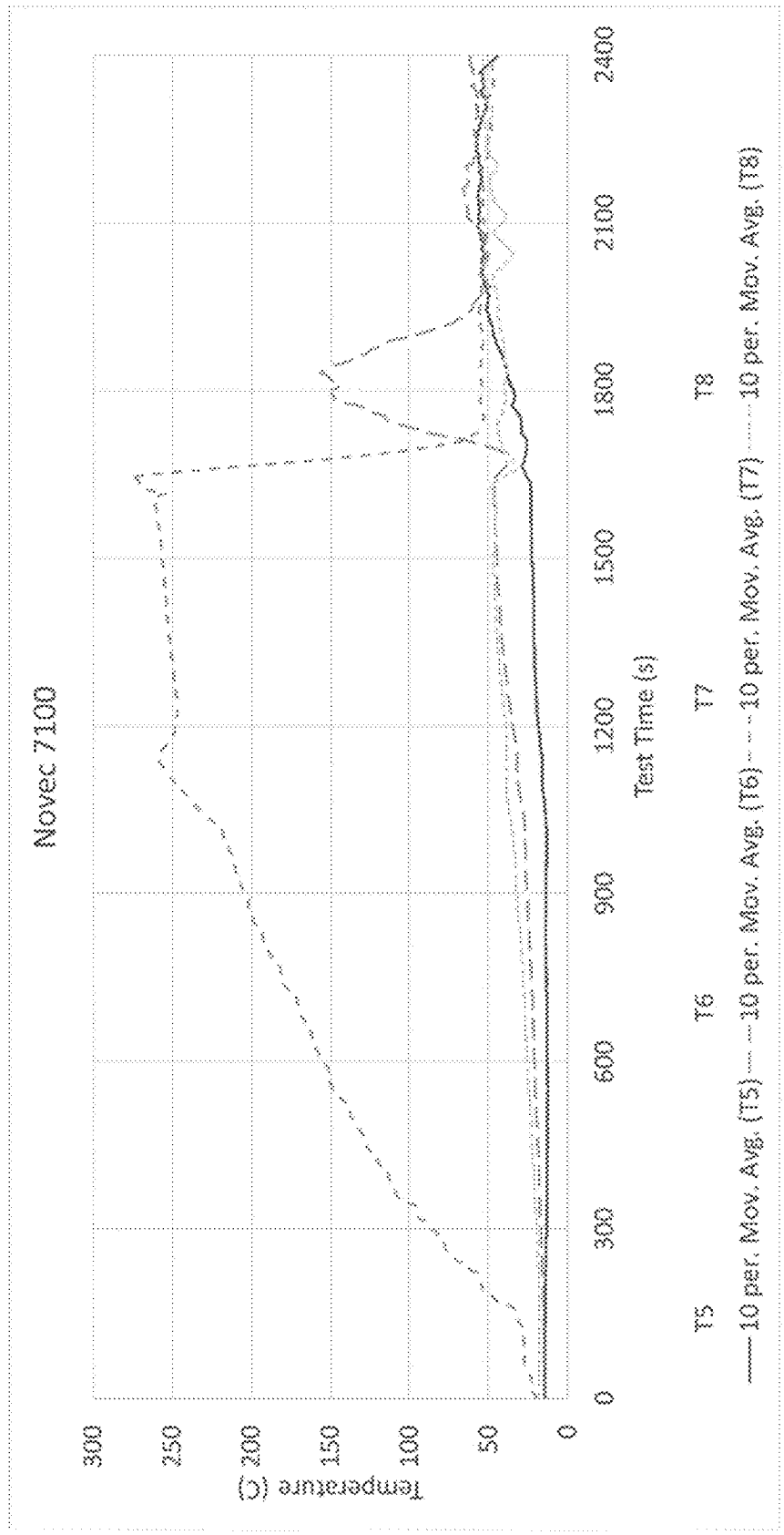

FIG. 1 shows an example of a system set forth herein.
FIG. 2 shows an example of two battery cells with an interspaced porous/fibrous media.
FIG. 3 shows certain physical properties of 3M Novec™ 7100.
FIG. 4 shows certain physical properties of 3M Novec™ 7700.
FIG. 5 shows the experimental battery setup without a fire suppression system, as set forth in Example 2.
FIG. 6 is a plot of Temperature (° C.) as a function of test time (seconds) for the battery pack in Example 2.
FIG. 7 shows the experimental battery setup with a fire suppression system, as set forth in Example 3.
FIG. 8 is a plot of Temperature (° C.) as a function of test time (seconds) for one battery pack in Example 3.
FIG. 9 is a plot of Temperature (° C.) as a function of test time (seconds) for a second battery pack in Example 3.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

The instant disclosure provides methods and systems for preventing and/or suppressing battery fires. The instant disclosure is applicable to energy storage installations that include lithium-ion batteries and are constructed and/or placed indoor, e.g., inside a building that is also used for people to conduct business. The energy storage installations described herein can also be used for outdoor installations, and these will have enhanced safety compared to conventional outdoor installations. Placing energy storage systems, such as those set forth herein, indoors will result in reduced system costs by not requiring, for example, secondary housings, HVAC systems, or dedicated land. As detailed below, certain methods herein rely on early detection, using a battery's battery management system, of a fire or battery failure before a fire develops. Certain methods herein rely on early detection using an off-gassing detection system. These off-gassing system may be used alone for detection purposes, or may be used in combination with another detection system set forth herein or known in the relevant field. This provides an earlier warning than a traditional fire alarm system. The battery management system, optionally through a control system and control module, deploys liquid coolant into the battery enclosure to completely submerge the failing battery module, thereby cooling the battery. This prevents thermal runaway from spreading to neighboring cells and prevents a fire from developing.

The instant disclosure sets forth a series of novel features. Certain of these features include, but are not limited to: (a) the use of a dielectric fluid that undergoes a phase change for rapid cooling of a failed battery cell; (b) the use of a non-conductive fluid that does not damage battery system components; (c) applying a dielectric fluid only to battery cells or modules that have failed, which reduces clean-up and fluid costs; and (d) the use of a BMS failure detection and suppression system activation.

There are many advantages to the instant disclosure. The instant disclosure sets forth a battery fire suppression system that does not destroy the energy storage system when used to suppress or prevent a fire. Currently available fire suppression systems either inundate the energy storage system with water (which causes additional short circuits and destroys control electronics), or fill the battery container with an inert gas which does not prevent thermal runaway. Since the instant disclosure sets forth the use of a non-conductive fluid to flood the battery enclosure, no short circuits will be caused. This reduces the heat that must be removed from the battery to make it safe. This also means control electronics are not damaged, so that the only parts that must be replaced after an incident will be the failed battery cell and the fire suppression liquid.

Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C., as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, "non-destructive," refers to a process that does not degrade a battery's capacity or maximum operating voltage by more than 50%.

As used herein, "open battery enclosure," refers to a battery enclosure that is passively exposed to the ambient environment on at least one side or through at least one value, port, or inlet.

As used herein, "battery cell," refers to the lowest denominator of an electrochemical energy storage device. A battery cell includes an anode, a cathode, a separator, and an electrolyte, and contact terminals. Battery cells in series may share adjacent electrodes or contacts. Battery cells herein is used interchangeably with electrochemical cell.

As used herein, "battery module" refers to a plurality of battery cells connected together in a combination of series and/or parallel configurations. A battery module may include an assembly of multiple battery cells packaged for use as a unit. A battery system may include any number of battery cells. These cells may be interconnected using in series connections, parallel connections, and various combinations thereof.

As used herein, "battery pack" refers to a plurality of battery modules connected together in a combination of series and/or parallel configurations As used herein, "detecting a high temperature," refers to an event in which a BMS or other instrument identifies or measures that a given battery cell or battery module has exceeded a particular temperature, e.g., 80° C. or greater, or has exceeded a particular heating rate, e.g., 15° C. per minute.

As used herein, "detecting a battery fault," refers to an event in which a BMS or other instrument identifies a failure of the battery which results, or may result, in a destructive event for the battery. A non-limiting example includes a BMS detecting that a battery cell is in thermal runaway as a consequence of lithium dendrites shorting the battery cell.

As used herein, "detecting a battery failure," refers to an event in which a BMS or other instrument identifies a failure which results in a destructive event for the battery or results in a battery fire.

As used herein, a "non-conductive dielectric fluid" is a fluid which does not conduct electricity and has a dielectric strength range that is greater than 10 kV/mm or a dielectric constant greater than 1.8. Herein, a non-conductive fluid is one which does not conduct electricity at rates higher than $1*10^{-5}$ S/cm.

As used herein, "control module," refers to an enclosure containing circuit boards preprogrammed with software containing the logic used to determine responses to various sensor inputs. The controller module software has output signals which can actuate pumps or valves at intervals according to its internal logic.

As used herein, "control system," refers to a device, or set of devices, that manages, commands, directs or regulates the behavior of other devices or systems. Control systems include, but are not limited to, a computer, a microprocessor, a microcontroller or a logic circuit, that actuate the valves and switches in the fire suppression system in order to permit the dielectric fluid, therein, to flow in one direction or another direction, or not at all. In certain instances, the microprocessor can be a field programmable gate array (FPGA). Control systems can also include temperature responsive devices (e.g., a thermostat) which sends or receives signals depending on the temperature of the components of the control system or the system controlled by the control system. In some examples, the control system may include a temperature-activated valve apparatus.

As used herein, the "onset temperature" is the temperature at which a battery cell or battery module will spontaneously develop a fire.

As used herein, the "thermal runaway temperature" is the temperature at which a battery cell or battery module will spontaneously initiate thermal runaway. Herein, "thermal runaway" means that the battery cell or battery module has a failure which causes the battery cell or battery module to increase in temperature in a way that cannot be controlled through the battery cooling devices or cooling functions that normally operate when the battery is operating normally.

Fire Suppression System

FIG. 1 shows one example of a fire suppression system with an energy storage installation, 110.

In FIG. 1, a tank of dielectric fluid, 100, is positioned in fluid communication with a fluid line. The fluid line connects the tank of dielectric fluid, 100, to the battery pack, 106, by way of fluid inlet valves, 102. Inside the battery pack, 106, optionally is/are a fluid level sensor, 101. The battery pack, 106, also includes a gas exhaust, 103. The battery pack, 106, may further include porous separators between battery cells or between battery modules. These porous separators aid in the diffusion of the dielectric fluid between battery cells that are pressed together (or positioned in proximity to each other). These porous separators may additionally act as a thermal mass/thermal barrier between adjacent cells to slow the spread of a thermal runaway event, even more than would be possible in their absence. These porous separators are illustrated and described below in FIG. 2. The battery pack, 106, may include a series of battery modules, 104. The battery cells in the battery modules, 104, are under the control of at least one battery management system (BMS), 105. As illustrated in FIG. 1, the BMS, 105, is able to acquire voltage and temperature data from the battery cells and modules. The BMS, 105, also controls the fluid inlet valves, 102, by sending valve actuation signals to the fluid inlet valves, 102. In some examples, the value actuation signals are sent by a control system with a control module, both of which are electrically coupled to the BMS.

The battery pack, 106, is enclosed in a watertight container. In some examples, the watertight container is open at the top or has other types of ventilation. In some examples, watertight means that the container can hold water with no leakage due to gravity, but the container may be otherwise open in a way which permits pressure equalization or gas exchange while maintaining no leakage due to gravity. In some examples, air ventilation is used to maintain the battery's temperature during normal operation. In certain examples, the battery pack's container is split into multiple water-tight sections to reduce the quantity of fluid required to submerge a failing cell and to increase the speed at which the empty space can be filled with dielectric fluid. For example, as a non-limiting example, in FIG. 1, the battery pack, 106, is split into four packs as illustrated in FIG. 1.

In some examples, as shown in FIG. 1, the tank of dielectric fluid, 100, is placed above the battery pack if the system is to be gravity fed. In some other examples, the tank of dielectric fluid, 100, may be placed an any arbitrary location and a fluid pump, 107, is included to transfer the dielectric fluid. In FIG. 1, the fluid pump, 107, is an optional feature which may or may not be present depending on whether the fire suppression system is a gravity fed system or one which relies on a fluid pump. Electrically controlled valves, 102, leading to each battery compartment are positioned along the fluid lines. In some examples, the fluid pump, 107, may be required if the fluid tank is located far from the battery pack, 106. In some examples, the fluid pump, 107, may be required if the fluid path in the fluid line is narrow. In some examples, the fluid pump, 107, may be used to increase the fluid flow rate for faster response time after a battery failure is detected.

FIG. 2 shows an example of two battery cells with an interspaced wick, which may be used in conjunction with an energy storage set forth herein. In FIG. 2, a collection of battery cells, 220, is shown. Battery cell 1, 202, and battery cell, 203, 2 are placed next to each other. In between battery cell 1, 202, and battery cell, 203, is a porous or fibrous, or both porous and fibrous, media, 201. When dielectric fluid is allowed to flow in contact with the media, 201, the dielectric fluid will be wicked between the cells as shown in step 204. By inserting a porous media as a wick between the battery cells, the porous media increases the area of heat transfer. Such a porous or fibrous, or both porous and fibrous, media, 201, could also be placed between battery modules to increase the area of heat transfer. The porous or fibrous, or both porous and fibrous, media, 201, will substantially increase the area of heat transfer working as a thermal barrier to prevent the heat from spreading out to the adjacent cells. Thermal barriers such as fyrewrap, as well as those set forth at https://www.unifrax.com/industry/fire-protection-industrial/, may be used in combination with the disclosure herein. As noted above, the porous or fibrous, or both porous and fibrous, media, 201, may additionally act as a thermal mass/thermal barrier between adjacent cells to slow the spread of a thermal runaway event, even more than would be possible in their absence.

Methods

In one embodiment, set forth herein is a method for non-destructive battery fire suppression including: providing, or having provided, at least one open battery enclosure including at least one battery cell or at least one battery module; detecting a high temperature, a battery fault, a battery failure, battery off-gassing, a fire, or a combination thereof, in the at least one battery cell or at least one battery module; and contacting the at least one battery cell or at least one battery module with a non-conductive dielectric fluid that undergoes a phase change during the contacting.

In some examples, the method includes detecting a high temperature in the at least one battery cell or at least one battery module; and contacting the at least one battery cell or at least one battery module with a non-conductive dielectric fluid that undergoes a phase change during the contacting.

In some examples, the method includes detecting a battery fault, in the at least one battery cell or at least one battery module; and contacting the at least one battery cell or at least one battery module with a non-conductive dielectric fluid that undergoes a phase change during the contacting.

In some examples, the method includes detecting a battery failure, in the at least one battery cell or at least one battery module; and contacting the at least one battery cell or at least one battery module with a non-conductive dielectric fluid that undergoes a phase change during the contacting.

In some examples, the method includes detecting battery off-gassing in the at least one battery cell or at least one battery module; and contacting the at least one battery cell or at least one battery module with a non-conductive dielectric fluid that undergoes a phase change during the contacting.

In some examples, the method includes detecting a fire in the at least one battery cell or at least one battery module; and contacting the at least one battery cell or at least one battery module with a non-conductive dielectric fluid that undergoes a phase change during the contacting.

In some embodiments, including any of the foregoing, the dielectric fluid is non-aqueous.

In some embodiments, including any of the foregoing, the dielectric fluid is aqueous. In some examples, the dielectric fluid includes water. In some examples, the dielectric fluid is water.

In some embodiments, including any of the foregoing, the non-conductive dielectric fluid is not an inert gas under pressure.

In some embodiments, including any of the foregoing, the non-conductive dielectric fluid has a boiling point that ranges from equal to or greater than 60° C. to less than 80° C.

In some embodiments, including any of the foregoing, the non-conductive dielectric fluid has a boiling point that is within 20° C., and below (i.e., less than), the thermal runaway initiation temperature of the specific cell chemistry used in a given battery cell.

In some embodiments, including any of the foregoing, the non-conductive dielectric fluid has a boiling point that ranges from equal to or greater than 1° C. to less than 50° C. In some embodiments, including any of the foregoing, the non-conductive dielectric fluid has a boiling point that ranges from equal to or greater than 1° C. to less than 65° C.

In some embodiments, including any of the foregoing, the non-conductive dielectric fluid has a density of greater than 1 $g/cm^3$ to less than 2 $g/cm^3$.

In some embodiments, including any of the foregoing, the non-conductive dielectric fluid has a density of about 1.51 $g/cm^3$.

In some embodiments, including any of the foregoing, the non-conductive dielectric fluid has a dielectric strength range that is greater than 25 (0.1" gap, kV).

In some embodiments, including any of the foregoing, the non-conductive dielectric fluid is non-flammable.

In some embodiments, including any of the foregoing, the non-conductive dielectric fluid includes a perfluorocarbon.

In some embodiments, including any of the foregoing, the non-conductive dielectric fluid is a perfluorocarbon.

In some embodiments, including any of the foregoing, the non-conductive dielectric fluid is selected from the 3M™ Novec™ series.

In some embodiments, including any of the foregoing, the non-conductive dielectric fluid is selected from the 3M™ 7100 Novec™ series.

In some embodiments, including any of the foregoing, the non-conductive dielectric fluid is selected from the 3M™ 7700 Novec™ series.

In some embodiments, including any of the foregoing, the liquid coolant is Novec 7100™.

In some embodiments, including any of the foregoing, the non-conductive dielectric fluid is selected from the 3M™ Fluorinert™ series.

In some embodiments, including any of the foregoing, the non-conductive dielectric fluid is selected from the F2 Chemicals series.

In some embodiments, including any of the foregoing, the non-conductive dielectric fluid is selected from the group consisting of PP4, PP5, PP6, PP7, PP8, PP9, and PP10. In some embodiments, including any of the foregoing, the non-conductive dielectric fluid is PP4. In some embodiments, including any of the foregoing, the non-conductive dielectric fluid is PP5. In some embodiments, including any of the foregoing, the non-conductive dielectric fluid is PP6. In some embodiments, including any of the foregoing, the non-conductive dielectric fluid is PP7. In some embodiments, including any of the foregoing, the non-conductive dielectric fluid is PP7. In some embodiments, including any of the foregoing, the non-conductive dielectric fluid is PP9. In some embodiments, including any of the foregoing, the non-conductive dielectric fluid is PP10.

In some embodiments, including any of the foregoing, the method includes cooling the at least one battery cell or at least one battery module.

In some embodiments, including any of the foregoing, the method includes deploying liquid coolant only to the at least one battery cell where a high temperature, a battery fault, a battery failure, battery off-gassing, a fire, or a combination thereof was detected.

In some embodiments, including any of the foregoing, the method includes deploying liquid coolant only to the at least one battery module where a high temperature, a battery fault, a battery failure, battery off-gassing, a fire, or a combination thereof was detected.

In some embodiments, including any of the foregoing, the method includes cooling up to 220 kJ/L the at least one battery cell or at least one battery module.

In some embodiments, including any of the foregoing, the method includes gravity feeding the liquid coolant to the at least one battery cell or at least one battery module.

In some embodiments, including any of the foregoing, the method includes fluid pumping the liquid coolant to the at least one battery cell or at least one battery module.

In some embodiments, including any of the foregoing, the detecting a high temperature, a battery fault, a battery failure, battery off-gassing, a fire, or a combination thereof includes using a battery management system.

In some embodiments, including any of the foregoing, detecting a high temperature, a battery fault, a battery failure, battery off-gassing, a fire, or a combination thereof includes detecting voltage, temperature, internal resistance, or a combination thereof.

In some embodiments, including any of the foregoing, detecting a high temperature, a battery fault, a battery failure, battery off-gassing, a fire, or a combination thereof in at least one battery cell or at least one battery module includes using ultrasonic sensing or electrical impedance spectroscopy (EIS).

In some embodiments, including any of the foregoing, detecting a high temperature, a battery fault, a battery failure, battery off-gassing, a fire, or a combination thereof in at least one battery cell or at least one battery module includes detecting a low voltage in at least one battery cell or at least one battery module.

In some embodiments, including any of the foregoing, detecting a high temperature, a battery fault, a battery failure, battery off-gassing, a fire, or a combination thereof in at least one battery cell or at least one battery module includes detecting a sudden, unexpected reduction in cell voltage in the range of 100 mV-600 mV in at least one battery cell or at least one battery module.

In some embodiments, including any of the foregoing, detecting a high temperature, a battery fault, a battery failure, battery off-gassing, a fire, or a combination thereof in at least one battery cell or at least one battery module includes detecting a sudden, unexpected reduction in cell voltage in the range of 100 mV-600 mV, within 10 seconds, in at least one battery cell or at least one battery module.

In some embodiments, including any of the foregoing, detecting a high temperature, a battery fault, a battery failure, battery off-gassing, a fire, or a combination thereof in at least one battery cell or at least one battery module includes detecting a high voltage in at least one battery cell or at least one battery module.

In some embodiments, including any of the foregoing, detecting a high temperature, a battery fault, a battery failure, battery off-gassing, a fire, or a combination thereof in at least one battery cell or at least one battery module includes detecting that the temperature in at least one battery cell or at least one battery module is increasing rapidly.

In some embodiments, including any of the foregoing, the method includes detecting a high temperature, a battery fault, a battery failure, battery off-gassing, a fire, or a combination thereof in at least one battery cell or at least one battery module includes detecting thermal runaway.

In some embodiments, including any of the foregoing, the method includes detecting a high temperature, a battery fault, a battery failure, battery off-gassing, a fire, or a combination thereof in at least one battery cell or at least one battery module includes detecting that at least one battery cell is heating at up to 6.6° C./sec.

In some embodiments, including any of the foregoing, the method includes detecting a high temperature, a battery fault, a battery failure, battery off-gassing, a fire, or a combination thereof in at least one battery cell or at least one battery module includes detecting by gases generated during cell failure/off-gassing.

In some embodiments, including any of the foregoing, the method includes detecting a high temperature, a battery fault, a battery failure, battery off-gassing, a fire, or a combination thereof in at least one battery cell or at least one battery module In some embodiments, including any of the foregoing, the method includes detecting that at least one battery cell released approximately 3 MJ of thermal energy.

In some embodiments, including any of the foregoing, the at least one battery enclosure is coupled to a fluid line having a valve, and after detecting a high temperature, a battery fault, a battery failure, battery off-gassing, a fire, or a combination thereof in at least one battery cell or at least one battery module, the method includes actuating the valve and deploying the liquid coolant through the fluid line to the at least one battery cell or at least one battery module where a high temperature, a battery fault, a battery failure, battery off-gassing, a fire, or a combination thereof was detected.

In some embodiments, including any of the foregoing, the boiling point of the liquid coolant is below the thermal runaway temperature.

In some embodiments, including any of the foregoing, the fluid maintains a constant temperature at the exterior of the at least one battery cell or battery pack, wherein the temperature of the exterior of the at least one battery cell or battery pack is below the onset temperature.

In some embodiments, including any of the foregoing, the at least one battery enclosure includes at least two battery cells; and including preventing thermal runaway from propagating from one of the at least two battery cells to another of the at least two battery cells.

In some embodiments, including any of the foregoing, the at least one battery enclosure includes at least two battery modules; and including preventing thermal runaway from propagating from a battery cell in one of the at least two battery modules to another battery cell in the same battery module or another battery cell in a different battery module.

In some embodiments, including any of the foregoing, the method includes submerging the at least one battery cell or at least one battery module in the liquid coolant.

In some embodiments, including any of the foregoing, the method includes delivering up to 15 liters (L) of liquid coolant.

In some embodiments, including any of the foregoing, set forth herein is a system for implementing a method set forth herein.

In some embodiments, including any of the foregoing, set forth herein is a battery management system for implementing a method set forth herein.

Systems

In one embodiment, set forth herein is a system including, at least one watertight battery module including at least two battery cells, wherein each battery cell is separated by watertight partitions; at least one container including a non-conductive dielectric fluid; and at least one fluid line connecting the at least one container to the at least one watertight battery module; wherein the at least one fluid line includes at least one valve operably coupled to a battery management system (BMS).

In some embodiments, including any of the foregoing, the dielectric fluid is non-aqueous.

In some embodiments, including any of the foregoing, a porous or fibrous, or both porous and fibrous, media is placed between battery cells or between battery modules.

In some embodiments, including any of the foregoing, the non-conductive dielectric fluid is not an inert gas under pressure.

In some embodiments, including any of the foregoing, the non-conductive dielectric fluid has a boiling point that ranges from equal to or greater than 60° C. to less than 80° C.

In some embodiments, including any of the foregoing, the non-conductive dielectric fluid has a boiling point that ranges from equal to or greater than 1° C. to less than 50° C. In some embodiments, including any of the foregoing, the non-conductive dielectric fluid has a boiling point that ranges from equal to or greater than 1° C. to less than 65° C.

In some embodiments, including any of the foregoing, the non-conductive dielectric fluid has a density of greater than 1 g/cm$^3$ to less than 2 g/cm$^3$.

In some embodiments, including any of the foregoing, the non-conductive dielectric fluid has a density of about 1.51 g/cm$^3$.

In some embodiments, including any of the foregoing, the non-conductive dielectric fluid has a dielectric strength range that is greater than 25 (0.1" gap, kV).

In some embodiments, including any of the foregoing, the non-conductive dielectric fluid is non-flammable.

In some embodiments, including any of the foregoing, the non-conductive dielectric fluid includes a perfluorocarbon.

In some embodiments, including any of the foregoing, the non-conductive dielectric fluid is a perfluorocarbon.

In some embodiments, including any of the foregoing, the non-conductive dielectric fluid is selected from the 3M™ Novec™ series.

In some embodiments, including any of the foregoing, the non-conductive dielectric fluid is selected from the 3M™ 7100 Novec™ series.

In some embodiments, including any of the foregoing, the non-conductive dielectric fluid is selected from the 3M™ 7700 Novec™ series.

In some embodiments, including any of the foregoing, the liquid coolant is Novec 7100™.

In some embodiments, including any of the foregoing, the non-conductive dielectric fluid is selected from the 3M™ Fluorinert™ series.

In some embodiments, including any of the foregoing, the non-conductive dielectric fluid is selected from the F2 Chemicals series.

In some embodiments, including any of the foregoing, the non-conductive dielectric fluid is selected from the group consisting of PP4, PP5, PP6, PP7, PP8, PP9, and PP10.

In some embodiments, including any of the foregoing, the container has a capacity of 15 L.

In some embodiments, including any of the foregoing, the watertight battery module is open on top.

In some embodiments, including any of the foregoing, the watertight battery module is ventilated.

In some embodiments, including any of the foregoing, the at least one container is located higher than the watertight battery module.

In some embodiments, including any of the foregoing, the at least one container is not located higher than the watertight battery module and the system includes a fluid pump coupled to the container.

In some embodiments, including any of the foregoing, the watertight battery module has a capacity of 12.7 kWh.

In some embodiments, including any of the foregoing, the watertight battery module has an operating voltage of 38V.

In some embodiments, including any of the foregoing, the BMS includes ultrasonic, EIS, and off-gassing sensing capabilities.

In some embodiments, including any of the foregoing, the BMS includes failure detection and suppression system activation capabilities.

In some embodiments, including any of the foregoing, the system is located indoors.

In some embodiments, including any of the foregoing, the system does not have a HVAC system coupled thereto.

In some embodiments, including any of the foregoing, the system is coupled to a control system and a control module for actuating the fluid inlet values.

EXAMPLES

Example 1

In this Example, four individual 12.7 kWh, 38 V, battery modules are constructed. Each battery module is contained from the bottom and four perpendicular sides. The battery module is open from the top but is otherwise water-tight. The four battery modules are connected to a battery management system (BMS) and also a fluid tank of a nonconductive dielectric fluid, as shown in FIG. 1. In this example, the dielectric fluid is 3M Novec™ 7100, but other similar or equivalent fluids may also be used. Dielectric fluids with boiling points between 60° C. and less than 80° C. may be used. In other examples, other dielectric fluids may be used if the boiling point of the fluid is below (i.e., less than) the thermal runaway initiation temperature of the particular battery chemistry used in a given battery. However, this is not a limiting set of properties for the dielectric fluids, and other fluids are contemplated herein. Since the cell may become much hotter than 80° C., the dielectric fluids and their gases which are equivalent substitutes for 3M Novec™ 7100 include, but are not limited to, nonconductive dielectric fluids which are also non-flammable.

Below are certain properties and analysis of heat take away of 3M Novec 7100. 3M™ Novec™ 7100 Engineered Fluid, methoxy-nonafluorobutane ($C_4F_9OCH_3$), is a clear, colorless and low-odor fluid intended to replace ozone-depleting substances (ODSs) and compounds with high global warming potential (GWP) in many applications. A material description includes:

Ingredients 3M™ Novec™ 7100 Engineered Fluid.

Methoxy-nonafluorobutane 1 at 99.5% minimum; non-volatile residue (NVR) at 2.0 ppm maximum; appearance is clear, colorless. Novec 7100 fluid ($C_4F_9OCH_3$) consists of two inseparable isomers with essentially identical properties. These are $(CF_3)_2CFCF_2OCH_3$ (CAS No. 163702-08-7) and $CF_3CF_2CF_2CF_2OCH_3$ (CAS No. 163702-07-6). Physical properties are tabulated in FIG. 3 (all values at 25° C. unless specific otherwise).

Thermal property of Novec 7100:
Specific heat: $Cp$=1.183 kJ/kg K;
Heat of evaporation: 112 kJ/kg; and
The boiling temperature: =61° C.

When Novec 7100 is used as a coolant, it can take away 1.183 kJ/kg for 1 K temperature increment. The same fluid can take away 112 kJ/kg while maintaining the temperature at the boiling temperature (61° C.) during the phase change.

Other fluids can be used. For example, 3M Novec 7700 Engineered fluid can be used. 3M™ Novec™ 7700 Engineered Fluid is a nonflammable fluid with very low global warming potential for use in heat transfer applications. Novec 7700 fluid shares many of the inerting and dielectric properties of perfluorocarbons (PFCs) and perfluoropolyethers (PFPEs), and is a viable option for replacing them in a wide array of applications. Physical properties are tabulated in FIG. 4.

In one event, the BMS detects a failure in a given cell in the battery pack. The BMS detects or measures, for example, a combination of the cell's voltage, temperature, and internal resistance. This detection may also include ultrasonic and electrical impedance spectroscopy (EIS) sensing.

In one event, the BMS detects that the cell's voltage is very low (e.g., greater than 0.1V) or very high (e.g., greater than 4.5V), and its temperature is increasing rapidly (e.g., above 80° C.). The BMS then detects that the cell may have entered thermal runaway. A low voltage may indicate that the cell has been internally or externally short circuited. A high voltage may indicate that overcharging has damaged and overheated the cell. Different cell chemistries have different thermal runway onset temperatures, but they are typically around 80° C. or higher.

Once the onset temperature is reached, the failed cell self-heats at up to 6.6° C./sec until it has released approximately 3 MJ of electrical and chemical energy as thermal energy. When these conditions are detected by the BMS, the BMS actuates the fluid inlet values which allow the non-conductive dielectric fluid in the fluid tank to flow to the battery module containing the failed cell. The fluid inlet value is kept open by the BMS until the battery module containing the failed cell is flooded with dielectric fluid. In some examples, the BMS determines that the module is fully flooded by means of a fluid level sensor contained within the battery housing.

In some examples, the system continuously provides the fluid until the fire is suppressed. Since a conventional cooling system can only provide the coolant at its maximum rate, the ability to continuously provides the fluid until the fire is suppressed is a benefit of the instant disclosure compared to conventional cooling systems.

In some examples, the cooling system is designed to have the temperature variation between the inlet and outlet usually less than 5° C. to limit temperature variation.

In some examples, the cooling system should stop if the temperature difference is greater than an allowable preset value. For example, if operated at a higher temperature, this may damage the rest of the pack and may even initiate the failure of other parts of the battery pack.

When the battery compartment is flooded, the failed cell is cooled at up to 220 kJ/L of dielectric fluid due to the increased thermal conductivity of direct contact with fluid. By choosing a fluid that has a boiling point below the thermal runaway temperature, this cooling effect is particularly advantageous since both the heat capacity of the fluid and the fluid's heat of vaporization transfer heat away from the cell in a particularly efficient manner. The boiling of the fluid maintains a constant temperature at the exterior of the cell that is below the onset temperature, which prevents the reaction that resulted in the failed cell from spreading to other cells.

In one event, a so-called worst-case scenario, a fully charged cell enters thermal runaway, and 15 liters of dielectric fluid are used to prevent the reaction from spreading to other cells and save the energy storage system while preventing the cell from initiating a fire. The cooling provided by the dielectric fluid also slows (or stop, depending on the severity of the battery failure) the thermal runaway reaction inside the cell, providing more time for operators to react to the failed cell.

In another event, in a so-called best-case scenario, the non-conductive dielectric fluid has a low boiling temperature and can be injected into the battery enclosure before the internal temperature of the cell reaches the onset temperature for the second-phase of thermal runaway which occurs at around 180° C. Since the first stage of thermal runaway produces significantly less heat at a much slower rate than the second stage, and the fluid's boiling point ensures the exterior of the cell remains below that temperature, the proposed system prevents a thermal runaway event from occurring.

Example 2

In this Example, two, 0.33 kWh, 8V, battery modules were stacked in pack as shown in FIG. 5. Temperature thermocouples were placed at positions T1, T2, and T3. T1 was on top of the battery modules. T2 was in the middle. T3 was under the bottom battery module. A fire event was initiated in the bottom battery module.

Once the fire event occurred, the temperature readings on the Top (T1); Center (T2); and Bottom (T3) all increased in time for at least the first 1,500 seconds. Initially, the T3 measurement was the highest. However, after about 1000 seconds, the T1 and T2 measurements exceeded the amount measured for T3. This demonstrates that the fire event in the bottom module propagated to battery modules above it. The decrease in temperature observed for T1, T2, and T3, after 2000 seconds is due to the fire reducing in magnitude as the fuel for the fire was consumed.

Example 3

In this Example, six, 0.33 kWh, 8V, battery modules were stacked as shown in FIG. 7. Temperature thermocouples were placed at positions 1, 2, 3, 4, 5, 6, 7, and 8. A heater was placed under the bottom battery module to imitate a fire event in the bottom battery module.

A fire suppression system was coupled to the battery modules. The system included watertight battery modules including battery cells. The battery modules were separated by watertight partitions. The system included a container that included a non-conductive dielectric fluid. In a first example, the non-conductive dielectric fluid was FC 770. In a second example, the non-conductive dielectric fluid was Novec 7100. The system also included a fluid line connecting the non-conductive dielectric fluid container to the watertight battery modules that included battery cells. The fluid line included a value operably coupled to a battery management system (BMS).

In the first example, once the fire event occurred and was detected by the BMS, 4-5 gallons of FC 770 fluids was added to flood the bottom battery module. About 2 gallons of distilled water was then added as the FC 770 fluids keep evaporating. Distilled water was added at least 500 seconds after the FC 770 fluid to maintain the cooling process. As shown in FIG. 8, the FC 770 fluid deployed within the first 300 seconds of the fire event, and the cell temperatures became stable quickly. After the experiment concluded, FC 770 fluids remained on the bottom of the watertight partition around the bottom battery module with distilled water on top. As shown in FIG. 8, the fire event in the bottom battery module did not propagate to the battery modules above it.

Below are certain properties of 3M™ Fluorinert™ Electronic Fluid FC-770. FC-770 is a heat transfer fluid with properties including inertness, high dielectric strength and electrical resistivity. FC-770 is typically used in single or dual-phase direct contact systems in electronics. Applications include, high voltage transformers, power electronics, dry etchers, CVD machines and cooling Ion implanters.

FC-770 is a clear, colorless perfluoro liquid and has the following properties.

Average molecular weight: 339 g/mol.
Boiling Point (1 atm): 95° C.
Pour Point: −127° C.
Calculated Critical Temperature: 511 K
Latent Heat of Vaporization (at normal boiling point): 85.9 J/g
Liquid Density: 1793 kg/m$^3$
Kinematic Viscosity: 0.79 centistokes
Absolute Viscosity: 1.359 centipoise
Coefficient of Expansion: 0.00148° C.$^{-1}$
Surface Tension: 10 dynes/cm
Refractive Index: 1.27
Water Solubility: 14 ppmw
Solubility in Water: 1.3 ppmw In the second example, the same set-up as in FIG. 7 was used except a different non-conductive dielectric fluid was used. In this second example, once the fire event occurred and was detected by the BMS, 4-5 gallons of Novec 7100 fluid was added to flood the watertight bottom battery module. About 2 gallons of distilled water then added as the NOVEC 7100 fluids kept evaporating. Distilled water was added at least 500 seconds after the NOVEC 7100 fluid to maintain the cooling process. As shown in FIG. 9, the NOVEC 7100 fluid deployed within the first 300 seconds of the fire event, and the cell temperatures became stable quickly. After the experiment concluded, NOVEC 7100 fluids remained on the bottom of the watertight battery module with distilled water on top. As shown in FIG. 9, the fire event in the bottom battery module did not propagate to the battery modules above it.

This example demonstrates that Novec 7110 is more effective than FC 770. However, both fluids may be used in certain applications. Without being bound by theory, the Novec 7110 maybe more effective than FC 770 due to its lower boiling point and ease of evaporation. FC 770 also worked well. These experiments show that water would also suppress the fire as FC 770 did.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A system comprising:
    a watertight container;
    at least one watertight battery module comprising at least two battery cells, wherein each battery cell is separated by watertight partitions, wherein the at least two battery cells are inside the watertight container;
    a porous media between each at least one battery cell;

at least one container comprising a non-conductive dielectric fluid; and at least one fluid line connecting the at least one container to the at least one watertight battery module;

wherein the at least one fluid line comprises at least one valve operably coupled to a battery management system (BMS).

2. The system of claim 1, wherein the non-conductive dielectric fluid is non-aqueous.

3. The system of claim 1, wherein the non-conductive dielectric fluid is not an inert gas under pressure.

4. The system of claim 1, wherein the non-conductive dielectric fluid has a boiling point that ranges from equal to or greater than 60° C. to less than 80° C.

5. The system of claim 1, wherein the non-conductive dielectric fluid has a boiling point that ranges from equal to or greater than 1° C. to less than 50° C.

6. The system of claim 1, wherein the non-conductive dielectric fluid has a density of greater than 1 g/cm$^3$ to less than 2 g/cm$^3$.

7. The system of claim 6, wherein the non-conductive dielectric fluid has a density of about 1.51 g/cm$^3$.

8. The system of claim 1, wherein the non-conductive dielectric fluid comprises a perfluorocarbon.

9. The system of claim 1, wherein the non-conductive dielectric fluid comprises methoxy-nonafluorobutane.

10. The system of claim 1, wherein the watertight battery module is open on top.

11. The system of claim 1, wherein the watertight battery module is ventilated.

12. The system of claim 1, wherein the at least one container is located higher than the watertight battery module.

13. The system of claim 1, wherein the at least one container is not located higher than the watertight battery module and the system comprises a fluid pump coupled to the container.

14. The system of claim 1, wherein the BMS comprises ultrasonic, EIS, and off-gassing sensing capabilities.

15. The system of claim 1, wherein the BMS comprises failure detection and suppression system activation capabilities.

16. The system of claim 1, wherein the system does not have a HVAC system coupled thereto.

17. The system of claim 16, wherein the non-conductive dielectric fluid comprises water.

18. The system of claim 1, further comprising a fibrous media placed between the at least one battery cell.

19. The system of claim 1, wherein the porous media is placed between at least two watertight battery modules.

20. The system of claim 1, wherein the porous media is filled with the non-conductive dielectric fluid.

* * * * *